D. Newton,
Animal Tedder.
No. 94,502.    Patented Sep. 7, 1869.
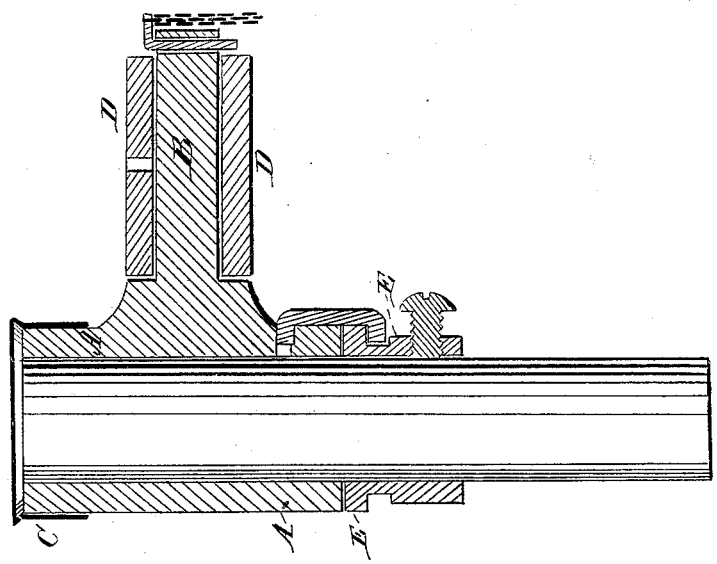
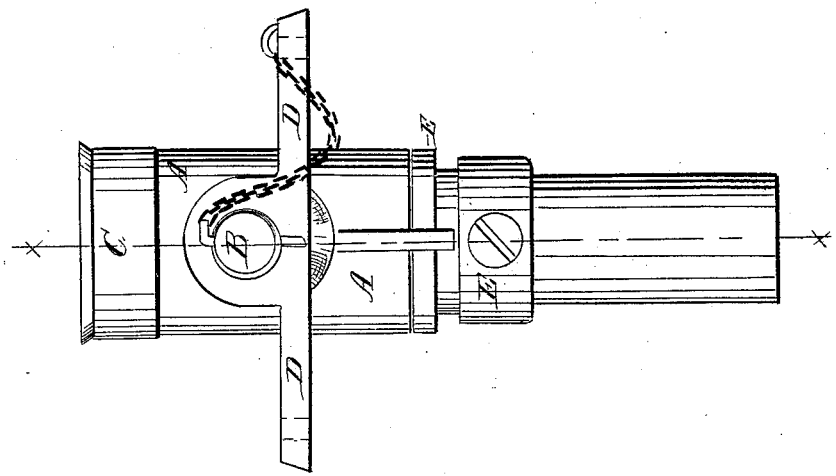
Witnesses
Isaac Newton.
Alvah Newton
Inventor
Daniel Newton

United States Patent Office.

DANIEL NEWTON, OF SOUTHINGTON, CONNECTICUT.

Letters Patent No. 94,502, dated September 7, 1869.

IMPROVEMENT IN ANIMAL-TEDDER.

The Schedule referred to in these Letters Patent and making part of the same.

To all whom it may concern:

Be it known that I, DANIEL NEWTON, of Southington, in the county of Hartford, and State of Connecticut, have invented a new and improved Apparatus for an Animal-Tedder; and I do hereby declare that the following is a full and exact description thereof, reference being had to the accompanying drawings, and to the letters of reference marked thereon.

I make a cylinder, A, about three inches long, and an inch and three-quarters in diameter outside, and about one inch orifice.

On the side of the cylinder, in a projection, and at right angles with the orifice, is an arm, B, of wrought-iron, which is placed in the mould when the cylinder is cast, with incisions cut in the same for the iron to run into, in order to secure suitable firmness, and prevent the arm from ever getting loose.

The top of the cylinder is covered with a cap, C, which is designed to protect the top from the weather.

On the arm B is a box, D, with a bolt-hole near each end, which is designed to secure the box to the pole, to which the animal is attached. Through the end of the arm is a hole, in which a pin is inserted to retain the pole on the arm.

The cylinder rests on a collar, E, which is provided with a set-screw, by which it is held firmly in its place on the bar. In this collar, near the upper side, is turned a groove, which receives one end of a piece of iron, which is bent at right angles near each end, one end of which passes through the cylinder, near the lower end, and is riveted with a set-punch on the inside, and the other end in the groove holds the cylinder and collar together on the bar, thus completing the construction of the apparatus.

This apparatus can be applied to any size bar or pole, and finished in any proportions best suited to the animals which are designed to occupy the same. The cylinder turning freely on the bar, and the pole vibrating on the arm, give freedom of range to all parts of the circle, under the least strain of the animal.

I claim the combination of the cylinder A, arm B, box D, and grooved collar E, all constructed and arranged to operate in the manner shown, and for the purpose set forth.

DANIEL NEWTON.

Witnesses:
   H. D. STANLEY,
   J. L. STANLEY.